US012765465B2

(12) United States Patent
Fay, II

(10) Patent No.: US 12,765,465 B2
(45) Date of Patent: Oct. 20, 2026

(54) VARIABLE SPEED CONDITIONER ROLLS FOR MOWER-CONDITIONER

(71) Applicant: CNH Industrial America LLC, New Holland, PA (US)

(72) Inventor: Jeffrey B. Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 1093 days.

(21) Appl. No.: 17/842,136

(22) Filed: Jun. 16, 2022

(65) Prior Publication Data

US 2023/0403980 A1 Dec. 21, 2023

(51) Int. Cl.
*A01D 82/02* (2006.01)
*A01D 69/02* (2006.01)
*A01D 69/03* (2006.01)
*G05B 19/416* (2006.01)

(52) U.S. Cl.
CPC ............ *A01D 82/02* (2013.01); *A01D 69/02* (2013.01); *A01D 69/03* (2013.01); *G05B 19/416* (2013.01); *G05B 2219/45017* (2013.01)

(58) Field of Classification Search
CPC ........ A01D 82/00; A01D 82/02; A01D 69/00; A01D 69/02; A01D 69/03; A01D 34/00; G05B 19/00; G05B 19/02; G05B 19/18; G05B 19/416; G05B 19/4163; G05B 19/4166; G05B 2219/00; G05B 2219/30; G05B 2219/45; G05B 2219/45017
USPC ............................................................... 701/5
See application file for complete search history.

(56) References Cited

U.S. PATENT DOCUMENTS

| | | | | |
|---|---|---|---|---|
| 4,009,556 | A | 3/1977 | Molzahn | |
| 5,394,678 | A * | 3/1995 | Lonn | A01D 34/006 56/294 |
| 6,431,981 | B1 | 8/2002 | Shinners et al. | |
| 7,730,701 | B1 | 6/2010 | Ehrhart et al. | |
| 7,877,974 | B2 | 2/2011 | McLean et al. | |
| 10,080,328 | B2 | 9/2018 | Kraus | |
| 10,813,287 | B2 | 10/2020 | Rotole et al. | |
| 2018/0271024 | A1 | 9/2018 | Mayerle | |
| 2018/0325031 | A1* | 11/2018 | Rotole | A01D 43/102 |
| 2019/0116733 | A1 | 4/2019 | Wire et al. | |
| 2020/0205345 | A1* | 7/2020 | Bollinger | A01D 57/26 |
| 2020/0375108 | A1* | 12/2020 | Nielsen | A01D 43/085 |
| 2021/0132588 | A1* | 5/2021 | Harmon | A01C 23/007 |
| 2021/0360857 | A1 | 11/2021 | Steindinger et al. | |

OTHER PUBLICATIONS

Extended European Search Report for EP Application No. 23179575.8 dated Nov. 15, 2023 (eight pages).

* cited by examiner

*Primary Examiner* — Khoi H Tran
*Assistant Examiner* — Sarah A Tran
(74) *Attorney, Agent, or Firm* — Buchanan Ingersoll & Rooney PC

(57) ABSTRACT

An agricultural machine system includes: a mower-conditioner machine including a plurality of conditioner rolls; a control system operatively coupled with the mower-conditioner machine, the control system including: a controller system configured for: determining a conditioner speed adjustment, as an independent parameter, based at least in part on a ground speed of the mower-conditioner machine.

18 Claims, 4 Drawing Sheets

VARIABLE SPEED CONDITIONER ROLLS FOR MOWER-CONDITIONER

FIELD OF THE INVENTION

The present invention pertains to agricultural machines, and, more specifically, to mower-conditioner machines.

BACKGROUND OF THE INVENTION

Generally speaking, forage (which can also be referred to herein as crop, crop material, forage crop, forage material, or forage crop material) is plant matter that can be harvested and provided to livestock or other animals as fodder, including but not limited to cattle, sheep, goats, and horses, during, for example, the winter or at other times when pasture land has inadequate amounts of vegetation for livestock or other animals. Depending upon the processing of the forage, forage can be formed into hay or silage. Both hay and silage can be made from grass and legumes (or mixtures thereof), and silage can also be made from, for example, corn or wheat. Hay (whether grass hay, legume hay, or a mixture thereof) results from a process that includes planting (though the plant matter is often perennial), growing, cutting, drying, and storing. Depending upon location, grass hay can include, for example, orchard grass, timothy, fescue, brome, Bermuda grass, Kentucky bluegrass, and/or ryegrass, whereas legume hay can include, for example, alfalfa, clover, and/or birdsfoot trefoil. Silage (which can, at least in some circumstances, also be referred to as haylage) can involve causing the crop material to ferment.

Further, depending upon the desired end product with respect to the forage (i.e., hay or silage), a variety of forage processing operations can be involved, and these forage processing operations include haymaking operations and silage-making operations. Haymaking operations, for example, can include cutting (which can be referred to as mowing), conditioning, tedding, raking, merging, chopping, baling, bale retrieval, transport, and/or storage, and silage-making operations can include not only cutting but also chopping, baling, and/or ensiling (or at least some sort of covering). A variety of agricultural harvesting machines can be used to perform these operations.

One such agricultural harvesting machine is a mower-conditioner machine (which can also be referred to as a mower-conditioner). Such mower-conditioner machines can be formed as a pull-type mower-conditioner coupled with a tractor, or, alternatively, a header attachment to a self-propelled windrower. Farmers may operate such mower-conditioners to cut any sort of crop material (hay crop, wheat, etc.) from a field, to immediately condition the crop material, and eventually to deposit the cut crop into swaths or windrows on the field (hereinafter, windrow is used to refer to both swaths and windrows, unless stated otherwise). The cutting can be performed by a cutting mechanism of the mower-conditioner, the cutting mechanism (which can also be referred to as a cutter bar) being, for example, a series of rotary discs (which can be referred to as discs), or a sicklebar. Such conditioning can be performed by a pair of conditioning rolls (which can be referred to collectively as the conditioner) of the mower-conditioner, a crop mat flowing therebetween, and the conditioning can break, split, bend, crush, crack, and/or crimp the crop material, as is known. After conditioning the crop material, the crop material can engage a swath gate of the mower-conditioner and, optionally, windrow shields of the mower-conditioner or the self-propelled windrower, before being deposited on the ground.

A speed at which conditioner rolls rotate (that is, a conditioner speed) can be controlled by an input drive RPM (revolutions per minute) from the tractor for pull-type mower-conditioners or a header drive for self-propelled windrowers. The conditioner speed varies based on input speed. However, that which drives the conditioner rolls (that is, a conditioner drive) is mechanically coupled with the cutting mechanism, such that the conditioner speed is tied to a speed of the cutting mechanism (although provision of differing speed options for conditioners is known, these are still a fixed ratio with respect to the speed of the cutting mechanism). This, however, can present a problem. For example, with respect to a mower-conditioner with a cutting mechanism employing discs, the input RPM can be adjusted to optimize cut quality by setting a speed of the discs (that is, disc speed), which may be at the expense of conditioning quality. That is, as disc speed increases, so does conditioner speed. However, an increase in disc speed does not necessarily mean that there is a need for increased conditioner speed. For example, the disc speed is often increased, while ground speed is decreased, in order to provide improved cut quality in heavy crop material. The increase in disc speed will improve the cut quality by providing additional lift of the light crop material, but the decrease in ground speed reduces the mass flow rate of crop material through the conditioner rolls, which can result in poor conditioning quality due to a reduced mat thickness, and thus a reduced roll pressure on the conditioner rolls.

What is needed in the art is a way to improve conditioning by way of the conditioner rolls of the mower-conditioner.

SUMMARY OF THE INVENTION

The present invention provides a control system associated with the mower-conditioner configured for correlating the conditioner speed with a ground speed of the mower-conditioner.

The invention in one form is directed to an agricultural machine system, including: a mower-conditioner machine including a plurality of conditioner rolls; a control system operatively coupled with the mower-conditioner machine, the control system including: a controller system configured for: determining a conditioner speed adjustment, as an independent parameter, based at least in part on a ground speed of the mower-conditioner machine.

The invention in another form is directed to a control system of an agricultural machine system, the agricultural machine system including a mower-conditioner machine and the control system, the mower-conditioner machine including a plurality of conditioner rolls, the control system being operatively coupled with the mower-conditioner machine, the control system including: a conditioner speed adjustment, as an independent parameter, based at least in part on a ground speed of the mower-conditioner machine.

The invention in yet another form is directed to a method of using an agricultural machine system, the method including the steps of: providing a mower-conditioner machine and a control system, the mower-conditioner machine including a plurality of conditioner rolls, the control system being operatively coupled with the mower-conditioner machine and including a controller system; and determining, by the controller system, a conditioner speed adjustment, as an independent parameter, based at least in part on a ground speed of the mower-conditioner machine.

An advantage of the present invention is that it provides a variable speed conditioner for a mower-conditioner that correlates the speed of the conditioner rolls to the ground speed of the mower-conditioner, in order to optimize a mass flow rate of crop material through the conditioning rolls. Thus, the present invention provides coupling the conditioner speed to the mower-conditioner ground speed, independently of the speed of the cutting mechanism, in order to optimize the mass flow rate through the conditioner rolls. Such an adjustable conditioner roll speed also enables increasing the conditioner roll speed independently of the speed of the cutting mechanism in order to deposit the crop material farther behind the mower-conditioner, as is sometimes beneficial when a merger is used (such as on a self-propelled windrower).

Another advantage of the present invention is that it provides for reduced power consumption. For example, a reduction of mass flow rate of the crop material through the conditioner rolls means that a slower conditioner roll speed can be used not only to maintain an optimum flow rate of crop material, but also to reduce power consumption and turbulence under the mower-conditioner due to air flow from the conditioner rolls.

Yet another advantage of the present invention is that it provides for reduced blowdown of light crop material due to reduced turbulence under the mower-conditioner from the conditioner rolls.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with an agricultural vehicle, an agricultural machine, and/or components thereof are usually determined with reference to the direction of forward operative travel of the agricultural vehicle and/or agricultural machine, but they should not be construed as limiting. The terms "longitudinal" and "transverse" are determined with reference to the fore-and-aft direction of the agricultural vehicle and/or agricultural machine and are equally not to be construed as limiting. The terms "downstream" and "upstream" are determined with reference to the intended direction of crop material flow during operation, with "downstream" being analogous to "rearward" and "upstream" being analogous to "forward."

Figure 1:
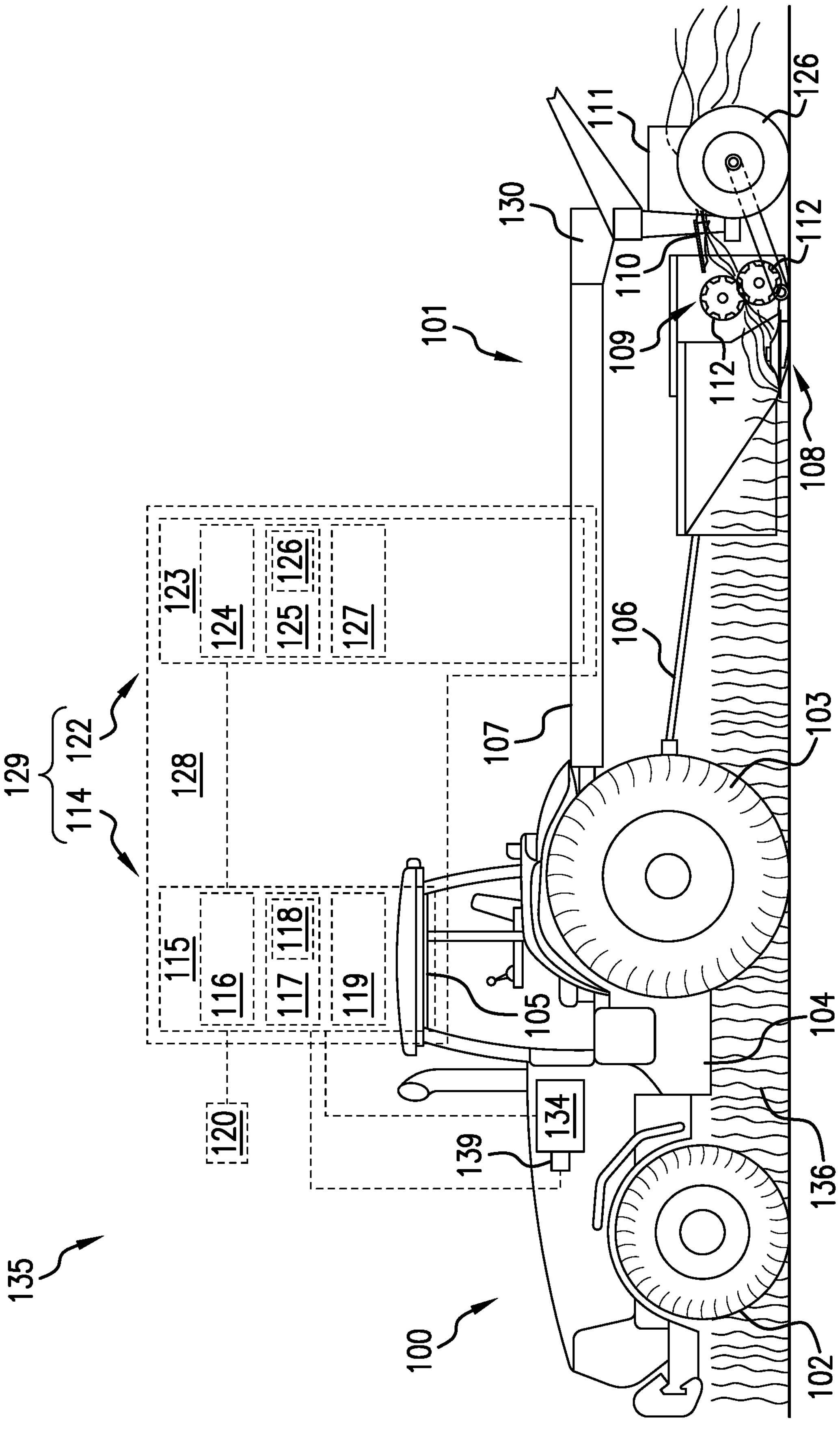
FIG. 1 illustrates schematically a side view of an exemplary embodiment of an agricultural machine system including an agricultural vehicle, formed as a tractor, a mower-conditioner machine, and a control system, in accordance with an exemplary embodiment of the present invention.

Referring now to the drawings, and more particularly to FIG. 1, there is shown an embodiment of an agricultural machine system 135 according to the present invention, system 135 including an agricultural work vehicle 100 (which can be referred to as a work vehicle, or an agricultural vehicle) and an agricultural machine 101 (which can be referred to as an agricultural implement, an implement), which is formed as a mower-conditioner machine 101 (which can be referred to as a mower-conditioner) and is being towed by, and thus coupled with, agricultural work vehicle 100, agricultural machine 101 to perform an agricultural operation within a field, namely, mowing and conditioning. As shown, work vehicle 100 can be configured as an agricultural tractor. Further, agricultural machine system 135 includes a control system 129 (which can be referred to as a unified control system 129). Unified control system 129 includes control system 114 of tractor 100, control system 122 of mower-conditioner 101, and, optionally, a control system (not shown) of a data center (not shown) that is cloud-based, Internet-based, and/or remotely located (this control system of the data center can be substantially similar to control systems 114, 122, having a controller, a processor, memory, data, and instructions, as described below with respect to control systems 114, 122). Control system 114 includes controller 115, and control system 122 includes controller 123. Further, unified system 129 can be said to include controller system 128, which includes controllers 115, 123. Control system 129, and thus also control systems 114, 122, are operatively coupled with each of frames 104, 130, and thus also with tractor 100 and mower-conditioner 101. Control system 114, in whole or in part, is further included as part of work vehicle 100, and control system 122, in whole or in part, is further included as part of mower-conditioner 101.

Figure 3:
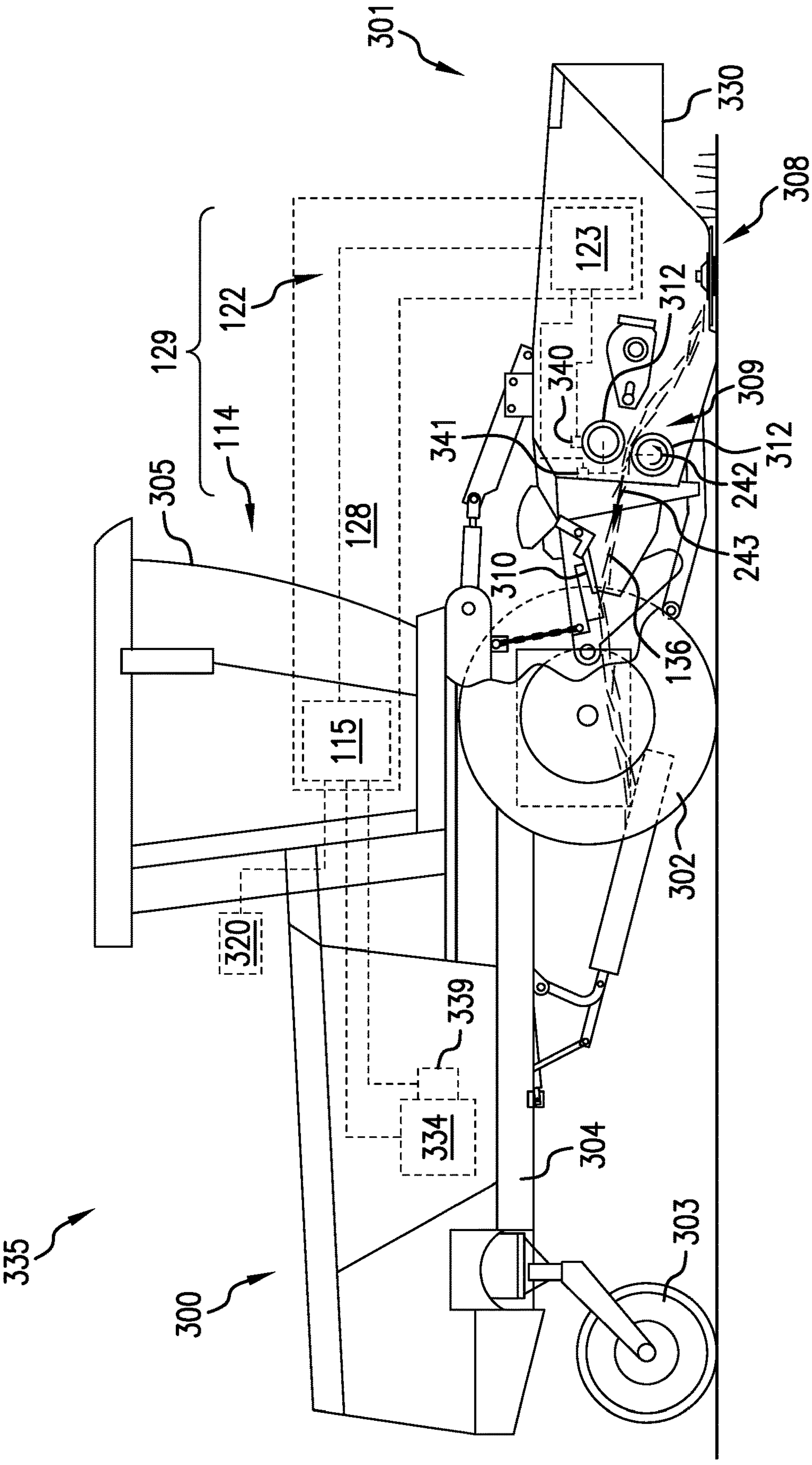
FIG. 3 illustrates schematically a side view of another exemplary embodiment of an agricultural machine system in accordance with an exemplary embodiment of the present invention.

Work vehicle 100 can be an operator-driven tractor or an autonomous tractor. However, in some embodiments, work vehicle 100 may correspond to any other suitable vehicle configured to tow a mower-conditioner machine across a field or that is otherwise configured to facilitate the performance of a mowing-conditioning operation, including an autonomous mower-conditioner vehicle. It should be further appreciated that mower-conditioner 101, while shown as being towed by tractor 100, may also be a self-propelled mower-conditioner that does not rely on a separate vehicle for propulsion and/or power to function (FIG. 3).

Work vehicle 100 includes a pair of front wheels 102, a pair of rear wheels 103, and a chassis 104 (which can also be referred to as a work vehicle frame 104 or tractor frame 104) coupled to and supported by the wheels 102, 103. An operator's cab 105 may be supported by a portion of the chassis 104 and may house various input devices for permitting an operator to control the operation of work vehicle 100 and/or mower-conditioner 101. Additionally, work vehicle 100 may include an engine and a transmission mounted on chassis 104. The transmission may be operably coupled to the engine and may provide variably adjusted gear ratios for transferring engine power to wheels 103 via a drive axle assembly. Control system 114, in whole or in part, can be coupled with frame 104.

As shown in FIG. 1, work vehicle 100 may be coupled to mower-conditioner 101 via a power take-off (PTO) 106 (which includes a PTO shaft, to which the arrow of 106 points in FIG. 1) and a tongue 107 to a hitch of work vehicle 100 to allow vehicle 100 to tow mower-conditioner 101 across the field.

As such, work vehicle 100 may, for example, guide mower-conditioner 101 toward crop material 136 standing in the field, such that mower-conditioner 101 in FIG. 1 is a pull-type mower-conditioner 101. As is generally understood, mower-conditioner 101, in addition to PTO 106 (which can be deemed to be part of tractor 100 or mower-conditioner 101) and tongue 107, includes frame 130, cutting mechanism 108, crop conditioner 109, swath gate 110, and windrow shields 111 (cutting mechanism 108, crop conditioner 109, swath gate 110, and windrow shields 111 each being coupled with frame 130). Cutting mechanism 108 is configured for cutting standing crop material 136 and further conveying crop material 136 rearwardly. Cutting mechanism 108 can be configured as a plurality of rotating discs which sever crop material 136 (as shown in FIG. 1), or, alternatively, as a plurality of reciprocating knives (such as a sicklebar). In a crop flow direction, subsequent to cutting mechanism 108 crop material 136 encounters two conditioning rolls 109. Crop conditioner 109 includes two conditioner rolls 112 (which can also be referred to as conditioning rolls, and which are coupled with frame 130), which rotate opposite one another (in FIG. 1, the top roll 112 rotates counter-clockwise, and the bottom roll 112 rotates clockwise)) and form a gap therebetween, through which the cut crop material 136 flows so as to be conditioned (i.e., breaking, splitting, bending, crushing, cracking, and/or crimping crop material 136). One or both conditioner rolls 112 can be driven, at least indirectly, by a mechanical input to mower-conditioner 101, in this case, by the PTO shaft of PTO 106 so as to impart a motive force to crop material 136 rearward (described more fully below). Thus, conditioner rolls 112 rotate with a speed (revolutions per minute (RPM)), which can be referred to as a conditioner speed (herein, unless specified otherwise, the conditioner speed refers to the angular velocity of rolls 112, wherein velocity and speed can be used interchangeably herein). Subsequent to conditioner rolls 112, a mat of crop material 136 strikes an underside of swath gate 110, in order to form a wide swath of crop material on the ground, or a narrower windrow, depending upon positioning of swath gate 110. Subsequent to swath gate 110, crop material 136 can, optionally strike windrow shields 111 (which can also be referred to as side shields), which can be positioned so as to form a windrow of crop material 136 on the ground. Further, mower-conditioners 101 can include a crop converging auger (not shown) between cutting mechanism 108 and conditioner 109 in a crop flow direction, the crop conveying auger configured for conveying crop material 136 from cutting mechanism 108 rearwardly towards conditioner 109, as is known.

Further, work vehicle 100 includes control system 114, which includes controller 115, which includes a processor 116, memory 117, data 118, and instructions 119. Control system 114 can further include an input/output device 120 such as a laptop computer (with keyboard and display), a touchpad (including keypad functionality and a display), and/or one or more switches, device 120 being configured for a user to interface therewith. Device 120 can be a plurality of devices spaced apart, for example, in cab 105 that allows operator to make inputs to controller 115.

Further, mower-conditioner 101 includes control system 122, which includes controller 123, which includes a processor 124, memory 125, data 126, and instructions 127. Controller 123 can communicate with controller 115, so that controller 115 outputs information to the display of input/output device 120 of work vehicle 100, thereby informing a user of various conditions of mower-conditioner 101. Further, mower-conditioner 101 includes a frame 130 (which can be referred to as mower-conditioner machine frame 130, or more generally as a machine frame 130) to which all of the components of mower-conditioner 101 are directly or indirectly coupled. Control system 122, in whole or in part, can be coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of mower-conditioner 101 described above and shown in FIG. 1 is provided only as one example. Thus, it should be appreciated that the present disclosure may be readily adaptable to any manner of mower-conditioner configuration, or other agricultural machines, such as a vehicle and/or implement, or a header.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases.

Tractor controller 115, herein, is assumed to be the primary controller for controlling operations of tractor 100, and mower-conditioner controller 123, herein, is assumed to be the primary controller for controlling operations of mower-conditioner 101, though it is understood that at different times each of controllers 115, 123 can control any of the other of the controllers 115, 123. Controllers 115, 123, as indicated in FIG. 1, can be in communication with the other of controllers 115, 123, thereby forming unified control system 129, such that any or all information associated with any controller 115, 123 can be shared with the other of controllers 115, 123, and any controller 115, 123 can perform the functions of the other controllers 115, 123. Controllers 115, 123 can communicate with each other in any suitable manner, such as a wired connection or a wireless connection, such as radio signals (RF), light signals, cellular, WiFi, Bluetooth, Internet, via cloud-based devices such as servers, and/or the like. Controllers 115, 123 can be configured to perform any of the functions of any of the other controllers 115, 123. Controllers 115, 123 can be a part of any network facilitating such communication therebetween, such as a local area network, a metropolitan area network, a wide area network, a neural network, whether wired or wireless. Control system 129, and controller system 128, are operatively coupled with tractor 100 and mower-conditioner 101, in particular with frames 104, 130. According to an embodiment of the present invention, tractor controller 115 can issue commands to mower-conditioner controller 123. This is assumed to be the case herein, unless otherwise stated. According to an alternative embodiment of the present invention, mower-conditioner controller 123 can issue commands to tractor controller 115 (such as for ISOBUS III or higher implements and/or vehicles). This is assumed to be the case herein, unless otherwise stated.

Control system 129 can include additional sensors or other inputs. Control system 114 can further include a GPS (not shown) mounted on tractor 100 (the tractor GPS). The tractor GPS senses the location of tractor 100 within the field, as is known, and this data can be provided to controllers 115, 123. Similarly, control system 122 can further include a GPS (not shown) mounted on mower-conditioner 101 (the mower-conditioner GPS). The mower-conditioner GPS senses the location of mower-conditioner 101 within the field, as is known, and this data can be provided to controllers 115, 123. Further, the operator, by way of device 120, can input or make certain settings. Control system 129 can further include any number additional control systems (with their individual controllers, processors, memory, data, and instructions, substantially similar to what is described above with reference to control systems 114, 122), and any such control system can have input/output devices as a part thereof and/or connected thereto.

Work vehicle 100 further includes a ground speed mechanism 134, coupled with frame 104. Ground speed mechanism 134 is well-known and thus will not be discussed in detail, but generally serves to cause work vehicle 100 to accelerate, to decelerate, or to maintain a constant speed across the ground, such as a field. For purposes herein, ground speed mechanism 134 can further include a braking system of work vehicle 100, which is well-known and thus will not be discussed in detail, but generally serves to cause the work vehicle to slow down or to stop. Ground speed mechanism 134 is operatively coupled with control system 114 by, for example, any suitable sensors and actuators known in the art for automatically controlling ground speed mechanism 134 of an automotive vehicle, wherein such sensors and actuators can be deemed to be included within both ground speed mechanism 134 and control system 114. Such sensors include one or more ground speed sensors 139 configured for sensing a ground speed of work vehicle 100 and for outputting a ground speed signal (that is, the agricultural work vehicle ground speed signal) corresponding to the ground speed of vehicle 100 to controller 115, and thus also to controller 123. Further, because in this embodiment of the present invention vehicle 100 pulls mower-conditioner 101, the ground speed of vehicle 100 is also a ground speed of mower-conditioner 101; thus, the ground speed of the mower-conditioner 101 is associated with the ground speed of the vehicle 100.

Figure 2:
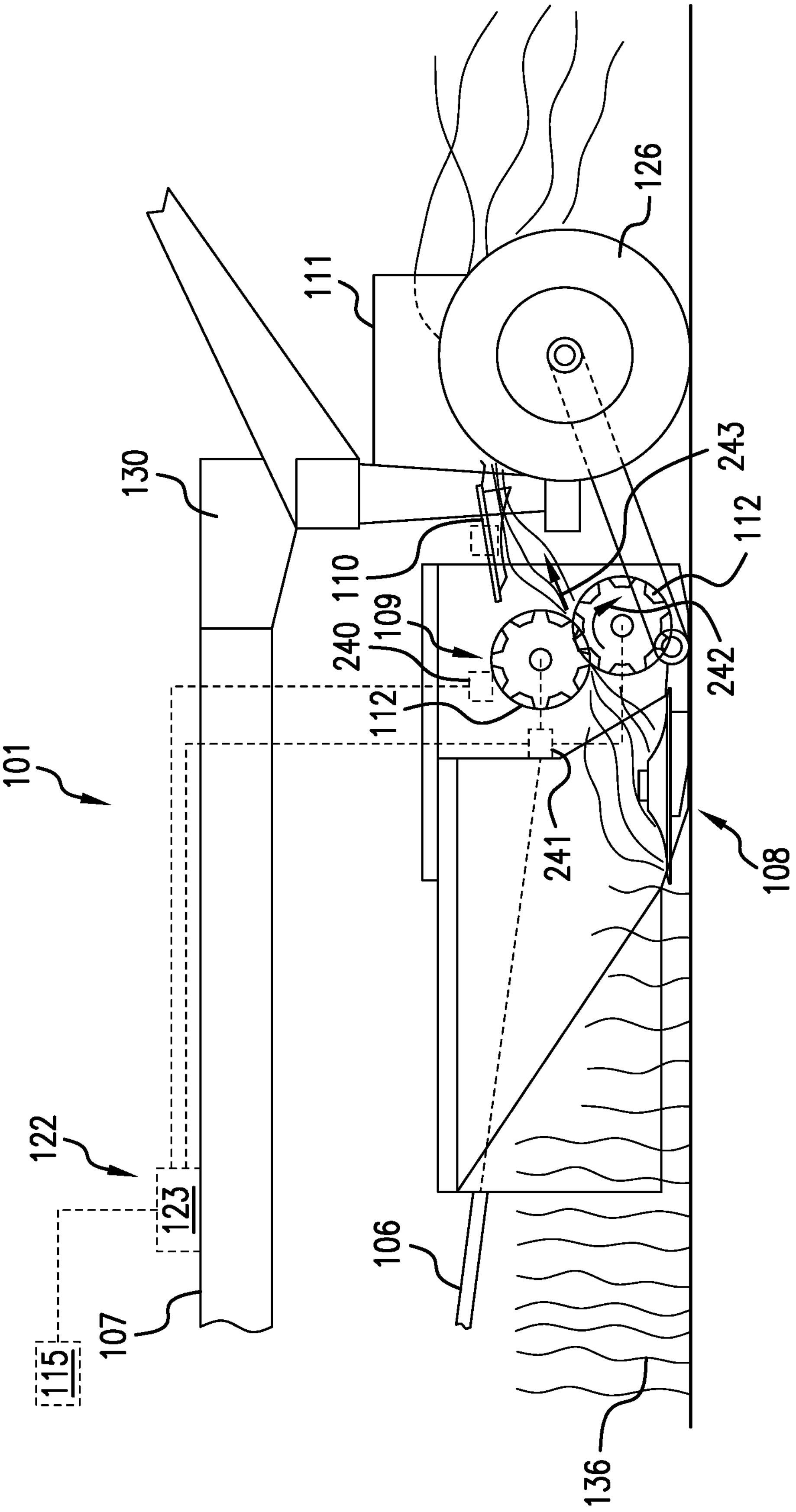
FIG. 2 illustrates schematically a side view of the mower-conditioner of FIG. 1, in accordance with an exemplary embodiment of the present invention.

Referring now to FIG. 2, there is shown schematically a side view of mower-conditioner 101. Mower-conditioner 101, and also control system 122, further includes at least one sensor 240 coupled with frame 130. Sensor 240 is configured for sensing the conditioner speed of conditioner rolls 112, which can be configured to rotate at substantially the same speed as one another. The conditioner speed (unless specified otherwise herein) refers most specifically to the angular velocity 242 (ω) of conditioner rolls 112, though alternatively conditioner speed could refer to linear velocity ($v_c$) of rolls 112, considering that angular velocity and linear velocity are related by mathematical formula (linear velocity ($v_c$)=angular velocity (ω) times (*) the radius (r), here, the radius from a rotational axis of a respective roll 112 to a perimeter surface of the respective roll 112 which crop material 136 contacts (which can be referred to as the effective perimeter)). Herein, it is assumed that sensor 240 senses the angular velocity 242 (that is, the actual angular velocity ($\omega_{Act}$)) of at least one roll 112. As is known, the angular velocity 242 is measured about a rotational axis of a respective roll 112, and linear velocity 243 is measured about the effective perimeter of rolls 112. Further, sensor 240 outputs, to controller 123, a conditioner speed signal corresponding to the actual conditioner speed ($\omega_{Act}$) of conditioner rolls 112.

Further, mower-conditioner 101, and also control system 122, further includes a device 241, which is coupled with frame 130. Device 241 is positioned in a drive train of mower-conditioner 101 between the PTO shaft of PTO 106 providing mechanical power to mower-conditioner 101 and conditioner rolls 112. In this way, the conditioner speed of conditioner rolls 112 is independent of, and thus not tied to, a speed of cutting mechanism 108. Device 241 is thus configured for adjusting the conditioner speed of rolls 112 and thereby for varying the conditioner speed relative to the input speed of the PTO shaft, independently of the speed of cutting mechanism 108. Device 241 thus includes an actuator configured for adjusting (that is, for making an adjustment of) the conditioner speed (which can be referred to as the conditioner speed adjustment). Device 241 can be or otherwise include a continuously variable transmission (CVT), a hydraulic motor, and/or an electric motor. That is, this conditioner speed adjustment can be accomplished by: (1) the CVT acting as a CVT drive between the PTO shaft and rolls 112; (2) the hydraulic motor, which can be proportionally controlled, configured for driving rolls 112 independently of cutting mechanism 108; and/or (3) the electric motor which can be variable. Device 241 is not limited to the CVT, the hydraulic motor, or the electric motor—which are provided only by way of example and not limitation—but can be formed as any suitable device configured adjusting the conditioner speed and thereby varying the conditioner speed, as described.

Further, controller system 128, by way of controllers 115, 123, is configured for: (1) receiving the conditioner speed signal and the agricultural work vehicle ground speed signal; (2) determining the conditioner speed adjustment, as an independent parameter, based at least in part on the ground speed of mower-conditioner 101, wherein as an independent parameter the conditioner speed adjustment, and thus a conditioner speed of conditioner rolls 112, is independent of a speed of cutting mechanism 108 and any crop converging auger of the mower-conditioner machine 101, thus, determining the conditioner speed adjustment based at least in part on the conditioner speed signal and the agricultural work vehicle ground speed signal; and (3) outputting a conditioner speed adjustment signal, based at least in part on the conditioner speed adjustment, to device 241 configured for adjusting the conditioner speed of conditioner rolls 112. Regarding (2), as indicated above, the ground speed of mower-conditioner 101 is substantially similar to the ground speed of tractor 100, and thus the ground speed of mower-conditioner 101 is provided to controller system 128 by sensor 139. Further, as indicated above, sensor 240 provides the actual angular velocity ($\omega_{Act}$) of rolls 112 to controller system 128 in the form of the conditioner speed signal. Further, regarding the conditioner speed being independent of a speed of any crop converging auger of mower-conditioner 101, the driving of conditioner 109 is not in nonvariable drive connection with the crop converging auger (if one is present).

According to an exemplary embodiment of the present invention, controller system 128 can be configured to take various steps in order to output the conditioner speed adjustment signal. Upon receiving the conditioner speed signal (corresponding to the actual angular velocity ($\omega_{Act}$) of rolls 112 and the agricultural work vehicle ground speed signal (which corresponds to the actual ground speed of tractor 100 and also serves as the value for the actual ground speed of mower-conditioner 101), controller system 128 can calculate an actual linear velocity ($v_{c\text{-}Act}$) of rolls 112 knowing the actual angular velocity ($\omega_{Act}$) and the radius of rolls 112, using the formula referenced above relating linear velocity and angular velocity ($v_{c\text{-}Act}=\omega_{Act}$*the radius (r) of rolls 112). Further, from the actual linear velocity ($v_{c\text{-}Act}$) of rolls 112 (which is understood to be a vector disposed at an angle θ (not specifically labeled in FIG. 2) relative to a horizontal line in FIG. 2), a horizontal component ($v_{c\text{-}Act\text{-}Hz}$) of the actual linear velocity ($v_{c\text{-}Act}$) of rolls 112 can be calculated (i.e., $v_{c\text{-}Act\text{-}Hz}=v_{c\text{-}Act}*\cos\theta$). Further, controller system 128 can calculate a desired angular velocity ($\omega_{Des}$) of rolls 112 using the actual ground speed of mower-conditioner 101, which is the sensed ground speed of tractor 100 from sensor 139, by way of the following formula: $\omega_{Des}=a*(v_g/c)$, wherein "a" is a constant ratio of conditioner speed (in terms of angular velocity) to ground speed (of mower-conditioner 101)(this constant ratio is a predetermined ratio, based on testing), $v_g$ is the ground speed of mower-conditioner 101 (as indicated, sensed and provided by sensor 139), and c is the effective circumference of a respective roll 112 (effective circumference being measured about the effective perimeter which crop material 136 contacts). Then, controller system 128 can calculate a desired linear velocity ($v_{c\text{-}Des}$) of rolls 112, knowing the desired angular velocity ($\omega_{Des}$) and the radius of rolls 112, using the formula referenced above relating linear velocity and angular velocity ($v_{c\text{-}Des}=\omega_{Des}$*the radius (r) of rolls 112). Further, a horizontal component ($v_{c\text{-}Des\text{-}Hz}$) of the desired linear velocity ($v_{c\text{-}Des}$) of rolls 12 can be calculated (i.e., $v_{c\text{-}Des\text{-}Hz}=v_{c\text{-}Des}*\cos\theta$, wherein θ is the angle which the vector associated with linear velocity of rolls 112 actually makes with a horizontal line). Further, controller system 128 can compare $v_{c\text{-}Act\text{-}Hz}$ and $v_{c\text{-}Des\text{-}Hz}$, wherein the difference between these values ($v_{c\text{-}Diff\text{-}Hz}$) can then be used by controller system 128 to determine the conditioner speed adjustment. For instance, controller system 128 can have tables of values correlating $v_{c\text{-}Diff\text{-}Hz}$ with adjustments to be made to angular velocity of rolls 112. Alternatively or in addition thereto, this difference $v_{c\text{-}Diff\text{-}Hz}$ can be used to calculate back to a differential angular velocity ($\omega_{Diff}$) of rolls 112 that corresponds to determine the conditioner speed adjustment.

In use, the operator of system 135 can select an input speed to mower-conditioner 101 (for instance, the PTO RPM for pull-type mower-conditioners 101 as in FIG. 2, or the disc/sickle speed for self-propelled windrowers 301 as in FIG. 3). This selection can be made by operator using device 120. Further, the operator selects a ground speed for tractor 100/mower-conditioner 101 (such as by way of device 120, for example, and/or by manipulating an accelerator device) that is deemed optimum for the conditions being mowed. Controller system 128 will then determine an optimum conditioner speed (for instance, $v_{c\text{-}Diff\text{-}Hz}$ and/or $\omega_{Diff}$) based on the ground speed tractor 100/mower-conditioner 101 (from sensor 139). Thus, for example, assuming that testing shows that an optimum mass flow of crop material 136 through conditioner rolls 112 provides that the linear speed of conditioner rolls 112 is X % higher than the ground speed of mower-conditioner 101, then controller system 128 will adjust conditioner rolls 112 to the optimum conditioner speed.

Referring now to FIG. 3, there is shown agricultural machine system 335, according to another exemplary embodiment of the present invention. Many prior reference numbers with respect to agricultural machine system 135 are increased by a multiple of 100 and thus are substantially similar to the structures and function described and shown with respect to FIGS. 1 and 2, unless otherwise shown and/or described differently. Thus, agricultural machine system 135 is labeled as 335 in FIG. 3. Agricultural machine system 335 includes self-propelled windrower 300 and header 301, which is a mower-conditioner 301. Windrower 300 includes frame 304, front wheels 302, rear wheels 303, cab 305, input/output device 320, ground speed mechanism 334, ground speed sensor 339, control system 114, and can optionally include windrow shields (not labeled), instead of on mower-conditioner 301. Mower-conditioner 301 includes cutting mechanism 308, conditioner 309 including conditioner rolls 312 (with angular velocity 242 and linear velocity 243), swath gate 310, control system 122, conditioner sensor 340, and device 341. System further includes unified control system 129 including control systems 114, 122 and controller system 128. Control system 114 includes controller 115, and control system 122 includes controller 123. System 335 is used in a manner substantially similar to what is described above with respect to system 135.

Figure 4:
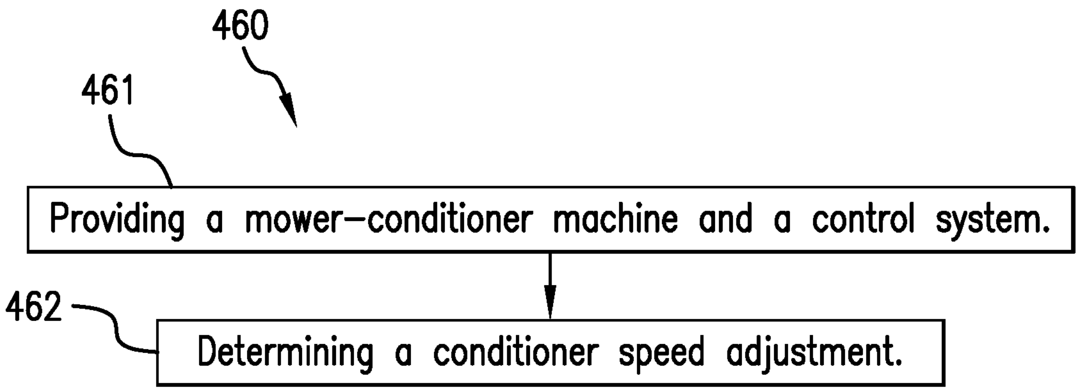
FIG. 4 illustrates a flow diagram showing a method of using an agricultural machine system, in accordance with an exemplary embodiment of the present invention.

Referring now to FIG. 4, there is shown a flow diagram showing a method 460 of using an agricultural machine system 135, 335. The method 460 includes the steps of: providing 461 a mower-conditioner machine 101, 301 and a control system 129, the mower-conditioner machine 101, 301 including a plurality of conditioner rolls 112, 312, the control system 129 being operatively coupled with the mower-conditioner machine 101, 301 and including a controller system 128; and determining 462, by the controller system 128, a conditioner speed adjustment, as an independent parameter, based at least in part on a ground speed of the mower-conditioner machine 101, 301, independent of a speed of a cutting mechanism 108, 308 and a crop converging auger each of the mower-conditioner machine 101, 301. Further, the mower-conditioner machine 101, 301 can include a mower-conditioner machine frame 130, 330 and a cutting mechanism 108, 308, the plurality of conditioner rolls 112, 312 and the cutting mechanism 108, 308 being coupled with the mower-conditioner machine frame 130, 330, wherein as an independent parameter the conditioner speed adjustment, and thus a conditioner speed of the plurality of conditioner rolls 112, 312, is independent of a speed of the cutting mechanism 108, 308 and any crop converging auger of the mower-conditioner machine 101, 301 between the cutting mechanism 108, 308 and the plurality of conditioner rolls 112, 312. Further, the agricultural machine system 135, 335 can include an agricultural work vehicle 100, 300, wherein the mower-conditioner machine 101, 301 is coupled with the agricultural work vehicle 100, 300, the ground speed of the mower-conditioner machine 101, 301 being associated with a ground speed of the agricultural work vehicle 100, 300. Further, the control system 129 further includes: a first sensor 240, 340 configured for: sensing the conditioner speed of the plurality of conditioner rolls 112, 312; outputting a conditioner speed signal corresponding to the conditioner speed of the plurality of conditioner rolls 112, 312; a second sensor 139, 339 configured for: sensing the ground speed of the agricultural work vehicle 100, 300; outputting an agricultural work vehicle ground speed signal corresponding to the ground speed of the agricultural work vehicle 100, 300; wherein the controller system 128 is further configured for: receiving the conditioner speed signal and the agricultural work vehicle ground speed signal; determining the conditioner speed adjustment based at least in part on the conditioner speed signal and the agricultural work vehicle ground speed signal; outputting a conditioner speed adjustment signal, based at least in part on the conditioner speed adjustment, to a device 241, 341 configured for adjusting the conditioner speed of the plurality of conditioner rolls 112, 312. Further, the mower-conditioner machine 101, 301 further includes the device 241, 341, which is or includes at least one of a continuously variable transmission, a hydraulic motor, and an electric motor.

It is to be understood that the steps of method 460 are performed by controller 115, 123, 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123, 128 described herein, such as the method 460, is implemented in software code or instructions which are tangibly stored on a tangible computer readable medium. The controller 115, 123, 128 loads the software code or instructions via a direct interface with the computer readable medium or via a wired and/or wireless network. Upon loading and executing such software code or instructions by controller 115, 123, 128, controller 115, 123, 128 may perform any of the functionality of controller 115, 123, 128 described herein, including any steps of the method 460.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural machine system, comprising:
- a mower-conditioner machine including a plurality of conditioner rolls; and
- a control system operatively coupled with the mower-conditioner machine, the control system including:
  - a controller system configured for:
    - determining a conditioner roll speed adjustment independently of a speed of a cutting mechanism of the agricultural machine system and based at least in part on a ground speed of the mower-conditioner machine.

2. The agricultural machine system of claim 1, wherein the mower-conditioner machine includes a mower-conditioner machine frame and the cutting mechanism, the plurality of conditioner rolls and the cutting mechanism being coupled with the mower-conditioner machine frame, wherein the conditioner roll speed adjustment, and thus a conditioner roll speed of the plurality of conditioner rolls, is independent of a speed of the cutting mechanism and any crop converging auger of the mower-conditioner machine between the cutting mechanism and the plurality of conditioner rolls.

3. The agricultural machine system of claim 2, further comprising an agricultural work vehicle, wherein the mower-conditioner machine is coupled with the agricultural work vehicle, the ground speed of the mower-conditioner machine being associated with a ground speed of the agricultural work vehicle.

4. The agricultural machine system of claim 3, wherein the control system further includes:
- a first sensor configured for:
  - sensing the conditioner roll speed of the plurality of conditioner rolls;
  - outputting a conditioner roll speed signal corresponding to the conditioner roll speed of the plurality of conditioner rolls;
- a second sensor configured for:
  - sensing the ground speed of the agricultural work vehicle;
  - outputting an agricultural work vehicle ground speed signal corresponding to the ground speed of the agricultural work vehicle;
- wherein the controller system is further configured for:
  - receiving the conditioner roll speed signal and the agricultural work vehicle ground speed signal;
  - determining the conditioner roll speed adjustment based at least in part on the conditioner roll speed signal and the agricultural work vehicle ground speed signal;
  - outputting a conditioner roll speed adjustment signal, based at least in part on the conditioner roll speed adjustment, to a device configured for adjusting the conditioner roll speed of the plurality of conditioner rolls.

5. The agricultural machine system of claim 4, wherein the mower-conditioner machine further includes the device, which one of is and includes at least one of a continuously variable transmission, a hydraulic motor, and an electric motor.

6. A control system of an agricultural machine system, the agricultural machine system including a mower-conditioner machine and the control system, the mower-conditioner machine including a plurality of conditioner rolls, the control system being operatively coupled with the mower-conditioner machine, the control system comprising:

a controller system configured for:

determining a conditioner roll speed adjustment independently of a speed of a cutting mechanism of the agricultural machine system and based at least in part on a ground speed of the mower-conditioner machine.

7. The control system of claim 6, wherein the control system is configured for being operatively coupled with the mower-conditioner machine, which includes a mower-conditioner machine frame and the cutting mechanism, the plurality of conditioner rolls and the cutting mechanism being coupled with the mower-conditioner machine frame, wherein the conditioner roll speed adjustment, and thus a conditioner roll speed of the plurality of conditioner rolls, is independent of a speed of the cutting mechanism and any crop converging auger of the mower-conditioner machine between the cutting mechanism and the plurality of conditioner rolls.

8. The control system of claim 6, wherein the agricultural machine system further includes an agricultural work vehicle, wherein the mower-conditioner machine is coupled with the agricultural work vehicle, the ground speed of the mower-conditioner machine being associated with a ground speed of the agricultural work vehicle.

9. The control system of claim 8, wherein the control system further includes:

a first sensor configured for:

sensing the conditioner roll speed of the plurality of conditioner rolls;

outputting a conditioner roll speed signal corresponding to the conditioner roll speed of the plurality of conditioner rolls;

a second sensor configured for:

sensing the ground speed of the agricultural work vehicle;

outputting an agricultural work vehicle ground speed signal corresponding to the ground speed of the agricultural work vehicle;

wherein the controller system is further configured for:

receiving the conditioner roll speed signal and the agricultural work vehicle ground speed signal;

determining the conditioner roll speed adjustment based at least in part on the conditioner roll speed signal and the agricultural work vehicle ground speed signal;

outputting a conditioner roll speed adjustment signal, based at least in part on the conditioner roll speed adjustment, to a device configured for adjusting the conditioner roll speed of the plurality of conditioner rolls.

10. The control system of claim 9, wherein the mower-conditioner machine further includes the device, which one of is and includes at least one of a continuously variable transmission, a hydraulic motor, and an electric motor.

11. A method of using an agricultural machine system, the method comprising the steps of:

providing a mower-conditioner machine and a control system, the mower-conditioner machine including a plurality of conditioner rolls, the control system being operatively coupled with the mower-conditioner machine and including a controller system; and determining, by the controller system, a conditioner roll speed adjustment independently of a speed of a cutting mechanism of the agricultural machine system and based at least in part on a ground speed of the mower-conditioner machine.

12. The method of claim 11, wherein the mower-conditioner machine includes a mower-conditioner machine frame and the cutting mechanism, the plurality of conditioner rolls and the cutting mechanism being coupled with the mower-conditioner machine frame, wherein the conditioner roll speed adjustment, and thus a conditioner roll speed of the plurality of conditioner rolls, is independent of a speed of the cutting mechanism and any crop converging auger of the mower-conditioner machine between the cutting mechanism and the plurality of conditioner rolls.

13. The method of claim 12, wherein the agricultural machine system further comprises an agricultural work vehicle, wherein the mower-conditioner machine is coupled with the agricultural work vehicle, the ground speed of the mower-conditioner machine being associated with a ground speed of the agricultural work vehicle.

14. The method of claim 13, wherein the control system further includes:

a first sensor configured for:

sensing the conditioner roll speed of the plurality of conditioner rolls;

outputting a conditioner roll speed signal corresponding to the conditioner roll speed of the plurality of conditioner rolls;

a second sensor configured for:

sensing the ground speed of the agricultural work vehicle;

outputting an agricultural work vehicle ground speed signal corresponding to the ground speed of the agricultural work vehicle;

wherein the controller system is further configured for:

receiving the conditioner roll speed signal and the agricultural work vehicle ground speed signal;

determining the conditioner roll speed adjustment based at least in part on the conditioner roll speed signal and the agricultural work vehicle ground speed signal;

outputting a conditioner roll speed adjustment signal, based at least in part on the conditioner roll speed adjustment, to a device configured for adjusting the conditioner roll speed of the plurality of conditioner rolls.

15. The method of claim 14, wherein the mower-conditioner machine further includes the device, which one of is and includes at least one of a continuously variable transmission, a hydraulic motor, and an electric motor.

16. The agricultural machine system of claim 1, wherein the conditioner roll speed adjustment is calculated based upon a difference between a desired linear velocity of the conditioner rolls and a determined velocity of the conditioner rolls.

17. The agricultural machine system of claim 16, wherein the desired linear velocity of the conditioner rolls is a linear velocity that is based on a measured ground speed of the mower-conditioner machine.

18. The agricultural machine system of claim 17, wherein the determined velocity of the conditioner rolls is a linear velocity that is based on a measured angular velocity of the conditioner rolls.

* * * * *